(12) United States Patent
Schroeder

(10) Patent No.: US 7,616,192 B2
(45) Date of Patent: Nov. 10, 2009

(54) TOUCH DEVICE AND METHOD FOR PROVIDING TACTILE FEEDBACK

(75) Inventor: Dale W. Schroeder, Scotts Valley, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 760 days.

(21) Appl. No.: 11/193,132

(22) Filed: Jul. 28, 2005

(65) Prior Publication Data

US 2007/0024593 A1   Feb. 1, 2007

(51) Int. Cl.
*G09G 5/00* (2006.01)

(52) U.S. Cl. .................. 345/173; 345/168; 345/175; 345/179

(58) Field of Classification Search ................ 345/173, 345/168, 175, 179
See application file for complete search history.

(56) References Cited

U.S. PATENT DOCUMENTS

| | | | | |
|---|---|---|---|---|
| 5,977,867 | A * | 11/1999 | Blouin | 340/407.2 |
| 7,006,654 | B2 * | 2/2006 | Stiles et al. | 381/412 |
| 2003/0058265 | A1 | 3/2003 | Robinson | |
| 2005/0017947 | A1 | 1/2005 | Shahoian | |
| 2005/0057528 | A1 | 3/2005 | Kleen | |
| 2006/0049920 | A1 * | 3/2006 | Sadler et al. | 340/407.1 |

* cited by examiner

*Primary Examiner*—Richard Hjerpe
*Assistant Examiner*—Leonid Shapiro

(57) ABSTRACT

A touch device includes a touch panel and a vibration device to provide tactile feedback to a user to locate a key on a display of the touch panel. A processor generates a drive signal to the vibration device when the position on the display touched by a finger or stylus corresponds to a location of a key on the display. The vibration device causes the display to vibrate in response to the drive signal to provide a tactile key location indication to the user while the key is touched.

26 Claims, 2 Drawing Sheets

TOUCH DEVICE AND METHOD FOR PROVIDING TACTILE FEEDBACK

BACKGROUND OF THE INVENTION

Manufacturers of hand-held and/or portable electronic devices, such as laptop computers, personal digital assistants (PDA), wireline or wireless telephones, video games and other similar electronic devices, are continually striving to improve customer satisfaction with the usage of input devices, while still fitting the input devices within the form factor of the electronic device. In order to provide common features, such as text messaging, calendar, games, phone book and web access, electronic devices typically include both a display and an input device. The display provides a graphical user interface to the customer to facilitate access to the features. The input device enables selection and implementation of the features (e.g., entering text, controlling cursor position and selecting or "clicking" on features). However, as the size of electronic devices shrinks, the available area on the electronic devices for both a display and an input device becomes limited.

Recently, touch screens have been introduced to the laptop and hand held device industries to reduce the area needed for a display and input device by combining input device functionality with a graphical user interface. For example, touch screens typically include a software-defined keypad ("soft keypad") displayed on the touch screen and a touch sensing mechanism for detecting when the touch screen is touched by a finger or stylus to input a key function. Exemplary touch sensing mechanisms include analog resistive, infrared, acoustic, capacitive or electromagnetic inductive sensors. Effective operation of a touch screen requires visual feedback to the user to locate and select menu items and other software-defined keys on the touch screen. However, for some users and in some situations, visual feedback may not be sufficient to determine that a key has been selected.

One solution for providing improved touch screen feedback is described in U.S. Pat. No. 5,977,867 to Blouin. In the Blouin patent, a vibrator is attached to the touch screen to provide a tactile vibrating sensation to the user when a key on the touch screen is selected. The vibrator vibrates for a time that is long enough for the user to feel the sensation, but short enough to terminate before the next key touch.

However, the Blouin touch screen design still requires visual feedback to the user to locate the key on the touch screen prior to touching the key. In some situations, it is desirable for the user to be able to locate keys without looking at the touch screen. For example, when driving, a user may prefer to locate and select a menu item or locate and dial numbers on a software keypad using only tactile feedback in order to maintain visual contact with the road. As another example, a vision-impaired user may be unable to operate a touch screen having key locations without tactile feedback. There is therefore a need for a tactile feedback mechanism to assist a user in locating keys on a touch screen.

SUMMARY OF THE INVENTION

Embodiments of the present invention provide a touch device including a touch panel and a vibration device for providing tactile feedback to a user to locate a key on a display of the touch panel. The display displays keys constituting a soft keypad. The touch panel is operable produce a position signal indicative of a position on the touch panel touched by a user-controlled object. A processor is operable in response to the position signal to generate a drive signal when the position on the display corresponds to a key location of one of the keys on the soft keypad. The vibration device causes the display to vibrate in response to the drive signal while the position corresponds to the key location to provide a tactile key location indication to the user.

In one embodiment, the display is planar and the vibration of the display is parallel to the plane of the display. In a further embodiment, the touch panel includes a housing in which the display is compliantly mounted and the vibration device includes a moveable portion that together with the display constitutes a mechanical assembly having a resonant frequency. The processor drives the moveable portion at a frequency equal to the resonant frequency of the mechanical assembly.

In another embodiment, the processor is additionally operable to detect damping of the vibration by the user-controlled device touching the display, and, in response to detecting damping, to generate a click indicate signal indicative of a click event performed by the user-controlled object on the key at the key location corresponding to the position on display.

In a further embodiment, the processor is operable to interrupt the drive signal in response to the click indicate signal to cause the vibration device to interrupt the vibration of the display. In yet a further embodiment, the touch device further includes an electro-acoustic transducer operable in response to the click indicate signal to produce an audible click indication to the user. In one aspect of the invention, the electro-acoustic transducer is operable to drive the display in a direction orthogonal to the plane of the display to produce the audible click indication.

Embodiments of the present invention further provide a method for providing tactile feedback to a user of a touch device. The method includes receiving a position signal indicative of a position on a display of the touch device touched by a user-controlled object, and comparing the position to key locations of keys displayed on the display. While the position corresponds to one of the key locations, the method further includes causing the display to vibrate to provide a tactile key location indication to the user.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

Figure 1:
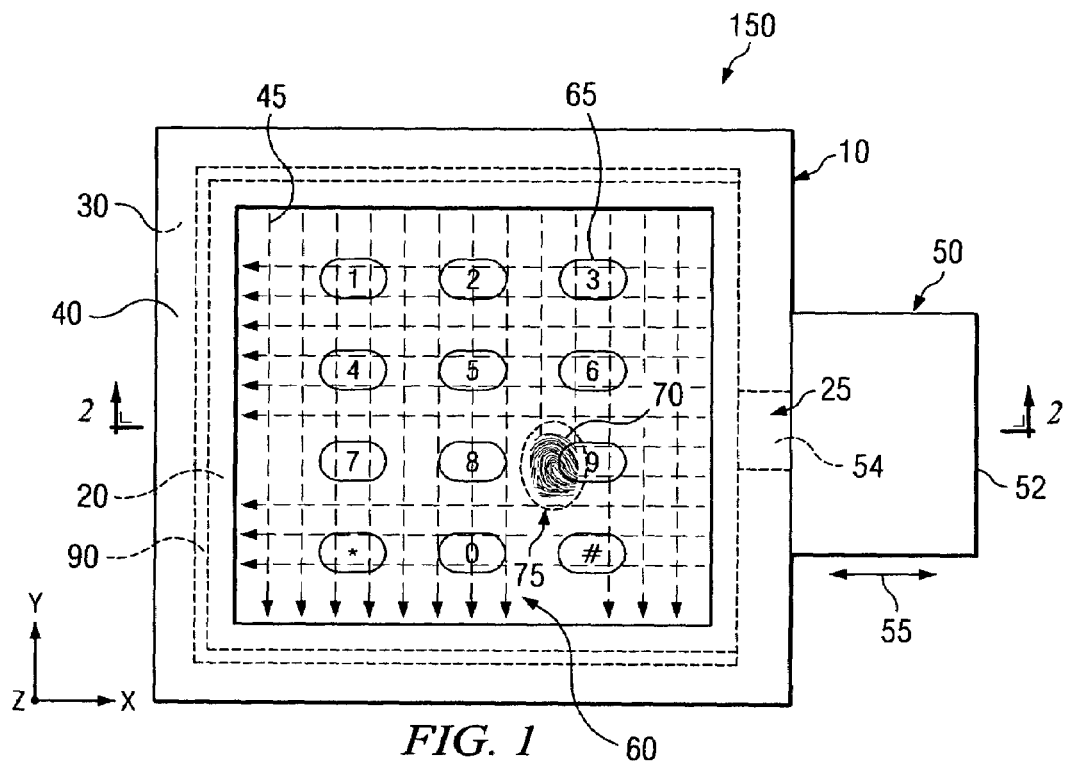
FIG. 1 is a front view of an exemplary tactile feedback touch device, in accordance with embodiments of the present invention.

FIG. 1 is a front view of an exemplary touch device 150 for providing tactile feedback, in accordance with embodiments of the present invention. The touch device 150 can be included in any type of electronic device. For example, electronic devices include wireless (cellular) telephones, personal digital assistants (PDAs), laptop computers, notebooks, hand-held video game devices, portable music players or other similar electronic devices. The touch device 150 includes a touch panel 10 and a vibration device 50.

The touch panel 10 shown in FIG. 1 includes a touch screen sensor 40 laid over a liquid crystal display (LCD) 20. The touch screen sensor 40 includes a linear array of infrared (IR) emitters located on two orthogonal sides of the touch screen sensor 40. The IR emitters form a matrix in the x-y plane of IR beams 45 across the display 20. IR detectors for detecting the IR beams 45 are arrayed along the sides of the touch screen sensor 40 opposite the IR emitters. Entry of a user-controlled object 70, such as a finger, pen, pointer or other stylus, into the matrix of IR beams 45 is detected when one or more IR beams 45 are broken and, therefore, no longer sensed by their corresponding IR detectors. The position (e.g., x, y coordinates) of the user-controlled object 70 in the touch screen sensor 40 is determined from the positions (e.g., x coordinates and y coordinates) of the broken IR beams 45 on the touch screen sensor 40. Although the touch screen sensor 40 shown in FIG. 1 is an IR touch screen sensor, in other embodiments, the touch screen sensor 40 is an analog resistive, acoustic, capacitive, ultrasonic or electromagnetic inductive touch screen sensor.

The display 20 is a configurable display capable of displaying one or more keys 65 constituting a software-defined ("soft") keypad 60. The size, shape, location and number of keys 65 are dependent upon the application and may be limited by the size of the display, the size of the user-controlled object 70 and the resolution of the touch screen sensor 40. For example, in one embodiment, as shown in FIG. 1, the keypad 60 is a numeric keypad 60 containing numeric keys 65 arranged as on a conventional telephone. In another embodiment, to assist users in identifying keys 65, each key 65 is a different size and/or shape (e.g., round, oval, square, rectangular, long, tall, thin, thick, etc.).

The vibration device 50 is operable to produce vibrations 55. Vibrations 55 cause the display 20 to vibrate to provide a tactile key location indication to the user, thereby enabling the user to locate a key 65 on the display 20. As shown in FIG. 1, the vibration device 50 includes a static portion 52 and a moveable portion 54. The static portion 52 of the vibration device 50 is coupled to the housing 30, while the moveable portion 54 of the vibration device 50 is moveable within the housing 30 and mechanically coupled to the display 20. The static portion 52 of the vibration device 50 drives the movable portion 54 of the vibration device 50 at a frequency corresponding to a resonant frequency of a mechanical assembly 25 formed of a combination of the display 20 and the moveable portion 54 of the vibration device 50. Although the vibration device 50 is shown and described herein as having a moveable portion 54 and a static portion 52, the vibration device 50 may include any type of device capable of casing the display 20 to vibrate with a linear or circular motion.

For example, in one embodiment, the vibration device 50 includes a rotary motor with an eccentric weight. The rotary motor is mechanically coupled to the display 20. The rotary motor causes the weight to rotate in plane parallel to the plane of the display 20 (i.e., x-y plane) to produce circular vibrations 55 of the display 20. Thus, as the motor drives the weight in a direction away from the display 20, the motion of the weight causes the display 20 to move in the opposite direction (i.e., further away from the motor). Likewise, as the motor drives the weight in a direction towards the display 20, the motion of the weight causes the display 20 to move towards the motor. The rotary motor increases the rotational speed of the weight until the rotational speed reaches the resonant frequency of the mechanical assembly 25. For example, the vibration device 50 can produce vibrations 55 at a resonant vibration frequency between 100-200 Hz. By vibrating the display 20 only in the x-y plane, there is no motion of the display 20 in the z-direction. Such motion of the large planar surface of the display 20 in the z-direction would generate audible acoustic energy.

In another exemplary embodiment, the vibration device 50 includes a linear motor comprising a permanent magnet and a voice coil located in a magnetic field of the permanent magnet. In one embodiment, the permanent magnet constitutes the static portion 52 and the voice coil constitutes the movable portion 54 of the vibration device 50. In an alternative embodiment, the voice coil constitutes the static portion 52 and the permanent magnet constitutes the movable portion 54 of the vibration device 50. The static portion 52 of the vibration device is coupled to the housing 30. In an example in which the permanent magnet constitutes the static portion 52 of the vibration device, an alternating drive signal applied to the voice coil drives the voice coil back and forth in the magnetic field in a direction parallel to the plane of the display 20 to produce linear vibrations 55 of the display 20. Once the frequency of the vibrations 55 reaches the resonant frequency of the mechanical assembly 25, the current needed to apply the alternating drive signal is reduced.

In yet another exemplary embodiment, the vibration device 50 is operable to modulate the amplitude of the vibration 55 dependent on the position of the user-controlled object 70 relative to the position of a key 65. In embodiments using a linear motor, the vibration amplitude is modulated by modulating the current of the drive signal applied to the voice coil. In embodiments using a rotary motor, the vibration amplitude is modulated by modulating the rotational speed of the rotary motor relative to the resonant frequency of mechanical assembly 25. Modulating the amplitude of the vibrations 55 produces a three-dimensional tactile key location indication that defines the contour of a key 65 sensed by the user. For example, as the user moves the user-controlled object 70 across a key 65, the amplitude of the vibrations 55 increase as the user-controlled object 70 approaches the center of the key 65 to give the impression that the key has a rounded edge instead of a square edge. As another example, as the user moves the user-controlled object 70 across a key 65, the amplitude of the vibrations 55 decrease as the user-controlled object 70 approaches the center of the key 65 to give the impression of the key 65 having a concave keycap. As a further example, amplitude variations can be used to define more complicated keys, such as rocker switches and 4-way navigation devices.

In a further embodiment, the vibration device 50 includes two or more vibration devices attached to different sides of the display 20. In another embodiment, the silent ring vibrator of the electronic device (e.g., cell phone or PDA) incorporating the touch device 150 is used as the vibration device. However, silent ring vibrators available today typically cause the entire electronic device (and not just the display 20) to vibrate, which may not be desirable in some applications.

The display 20 is compliantly mounted in a housing 30 via a flexible surround 90. In one embodiment, the flexible surround 90 is formed of a material, such as elastomer or rubber, and has a mechanical resonance at the frequency of the vibration 55. For example, the thickness, type and shape of the material forming the flexible surround 90 can be selected to produce the mechanical resonance of the flexible surround 90 at the resonant frequency of the mechanical assembly 25. At frequencies other than the resonant frequency of the mechanical assembly 25, the flexible surround 90 tightly couples the display 20 to the housing 30. However, at the resonant frequency of the mechanical assembly 25, the resonance of the flexible surround 90 decouples the display 20 from the housing 30. This reduces the power that the vibration device 50 needs to cause the display 20 to vibrate at the resonant frequency. In addition, the flexible surround 90 at resonance presents a high mechanical impedance to the housing 30 to minimize acoustic coupling between the display 20 and the housing 30, thereby minimizing vibrations in the housing 30.

In another embodiment, instead of using a mechanically-resonant flexible surround 90, the display 20 and the static portion 52 of the vibration device 50 are each compliantly coupled to the housing 30 to provide substantially equivalent acoustical coupling between the housing 30 and the display 20 and between the housing 30 and the vibration device 50. In addition, the display 20 and the static portion 52 of vibration device 50 vibrate in opposite directions, such that the net momentum collectively applied to the housing 30 by the mechanical assembly 25 and the vibration device 50 approaches zero. As a result of the substantially equivalent acoustical coupling, the vibrations 55 of the vibration device 50 cancel out the vibrations of the display 20, thereby minimizing the vibrations of the housing 30.

In a further embodiment, the vibration device 50 includes two or more vibration devices attached to different sides of the display 20. In another embodiment, the silent ring vibrator of the electronic device (e.g., cell phone or PDA) incorporating the touch device 150 is used as the vibration device. However, silent ring vibrators available today typically cause the entire electronic device (and not just the display 20) to vibrate, which may not be desirable in some applications.

The display 20 is compliantly mounted in a housing 30 via a flexible surround 90. In one embodiment, the flexible surround 90 is formed of a material, such as elastomer or rubber, that is resonant at the frequency of the vibration 55. For example, the thickness, type and shape of the material forming the flexible surround 90 can be selected to produce a mechanical resonance of the flexible surround 90 at the resonant frequency of the mechanical assembly 25. At frequencies other than the resonant frequency of the mechanical assembly 25, the flexible surround 90 tightly couples the display 20 to the housing 30. However, at the resonant frequency of the mechanical assembly 25, the resonance of the flexible surround 90 decouples the display 20 from the housing 30. This reduces the power that the vibration device 50 needs to cause the display 20 to vibrate. In addition, the flexible surround 90 at resonance presents a high impedance to the housing 30 to minimize acoustic coupling between the display 20 and the housing 30, thereby minimizing vibrations in the housing 30.

In another embodiment, instead of using a mechanically-resonant flexible surround 90, the display 20 and the static portion 52 of the vibration device 50 are each compliantly coupled to the housing 30 to provide substantially equivalent acoustical coupling between the housing 30 and the display 20 and between the housing 30 and the vibration device 50. In addition, the display 20 and vibration device 50 are configured to vibrate in opposite directions, such that the net momentum collectively applied to the housing 30 by the mechanical assembly 25 and the vibration device 50 approaches zero. As a result of the substantially equivalent acoustical coupling, the vibrations 55 of the vibration device 50 cancel out the vibrations of the display 20, thereby minimizing the vibrations of the housing 30.

In operation, when the user touches the display 20 at a position corresponding to the location of a key 65 on the soft keypad 60 with the user-controlled object 70 (e.g., finger or stylus), the vibration device 50 causes the display 20 to vibrate to provide a tactile key location indication to the user while that the user-controlled object is positioned over the key 65. As can be seen in FIG. 1, each key 65 occupies an area on the display 20 over which one or more IR beams 45 are directed in the x-y plane. The user initially positions the user-controlled object 70 in the matrix of IR beams 45 over a region 75 of the display 20. The region 75 on the display 20 occupied by the user-controlled object 70 is compared to each key area to determine if an overlap exists between the region 75 occupied by the user-controlled object and one of the key areas. If the region 75 of the display 20 occupied by the user-controlled object 70 is devoid of keys 65 (i.e., there is no overlap between the occupied region 75 and any key area), the vibration device is not activated. However, as the user-controlled object 70 is moved across the display 20 from a region devoid of keys 65 towards one of the key areas (i.e., when the occupied region 75 overlaps at least a portion of a key area), the vibration device 50 is activated to produce the vibration 55 of the display 20.

Figure 2:
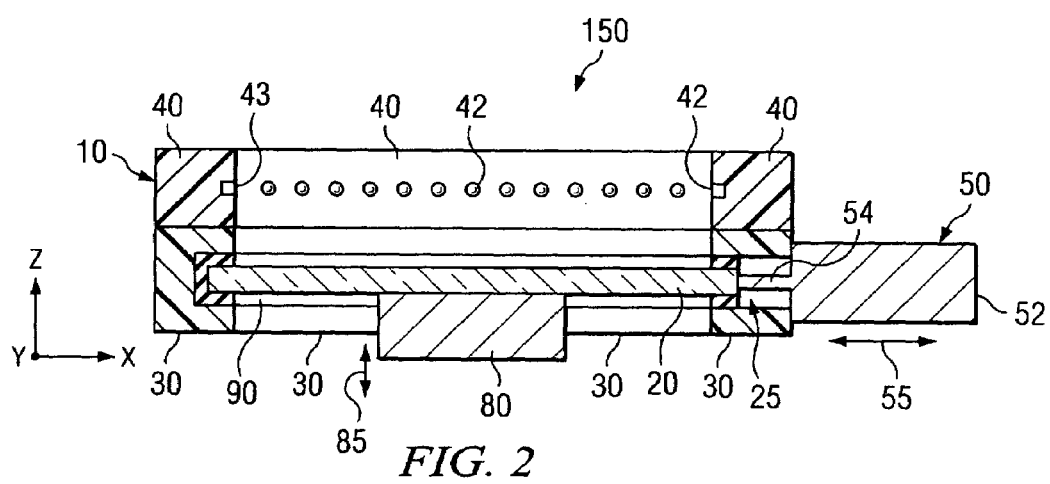
FIG. 2 is a cross-sectional view along the section line 2-2 of the exemplary tactile feedback touch device shown in FIG. 1, in accordance with embodiments of the present invention.

FIG. 2 is a cross-sectional view of the exemplary tactile feedback touch device 150, in accordance with embodiments of the present invention. As can be seen in FIG. 2, the display 20 is compliantly mounted in the resonant housing 30 by the flexible surround 90, and the touch screen sensor 40 is positioned above the housing 30. The touch screen sensor 40 includes IR emitters 42 located on two orthogonal sides of the touch screen sensor 40. The IR emitters 42 form a matrix in the x-y plane of IR beams across the display 20. IR detectors 43 for detecting the IR beams are arrayed along the sides of the touch screen sensor 40 opposite the IR emitters 42.

The static portion 52 and moveable portion 54 of the vibration device 50 are more clearly seen in FIG. 2. The static portion 52 of the vibration device 50 is fixed to the housing 30, while the moveable portion 54 of the vibration device 50 is moveable within the housing 30 and mechanically coupled to the display 20. The static portion 54 drives the moveable portion 52 to produce vibrations 55 of the mechanical assembly 25 (i.e., moveable portion 54 in combination with the display 20) in a direction parallel to the plane (x-y plane) of the display 20 when the user touches the display 20 at a position corresponding to a location of a key on the soft keypad displayed on the display 20 with a user-controlled object (e.g., finger or stylus). This provides a tactile key location indication to the user while the user-controlled object is positioned over the key.

As described above, once the frequency of the vibration 55 reaches the resonant frequency of the mechanical assembly 25, the drive signal needed to maintain the vibration 55 may be able to be reduced. However, when the user emulates pressing a key by applying a force on the display 20 in a direction orthogonal to the plane of the display 20, acoustic energy absorbed by the user-controlled device damps the vibration. This damping is used to indicate a click event performed by the user-controlled object. As used herein, the term "click event" refers to a selection, execution or drag function as performed by a left button of a conventional mouse. By way of example, but not limitation, click events include the single click function, the double click function and the click and drag function of a conventional mouse.

In one embodiment, the vibration device 50 detects the amplitude of the vibrations 55, and therefore, a reduction in the amplitude caused by damping the vibrations is used to indicate the click event. In embodiments using a linear motor, the vibration device detects damping as a result of an increase in the current needed to maintain the amplitude of the vibrations 55. As an example, a threshold level greater than the steady-state drive signal can be set for a click event. When the steady-state drive signal increases to the threshold level, a click event is detected. As another example, in embodiments using a rotary motor, damping can be detected through a servo-loop used to control the drive signal frequency.

To indicate to the user that a click event has been detected, the touch panel 10 or the electronic device incorporating the touch panel additionally provides some type of acoustic or tactile feedback to the user. In one embodiment, as shown in FIG. 2, the touch panel 10 further includes an electro-acoustic transducer 80 under the display 20 for producing an audible click indication to the user when a click event is detected. In an exemplary embodiment, the electro-acoustic transducer 80 drives the display 20 in a direction 85 (z-direction) orthogonal to the plane of the display 20 to produce the audible click indication. In another embodiment, the vibration device 50 is operable when a click event is detected to interrupt the vibration 55 of the display 20 for a predetermined time to provide a tactile click indication to the user. In a further embodiment, the click indication, such as an audible beep, tone or click, is provided to the user using a conventional loudspeaker built-in to the touch panel 10.

Figure 3:
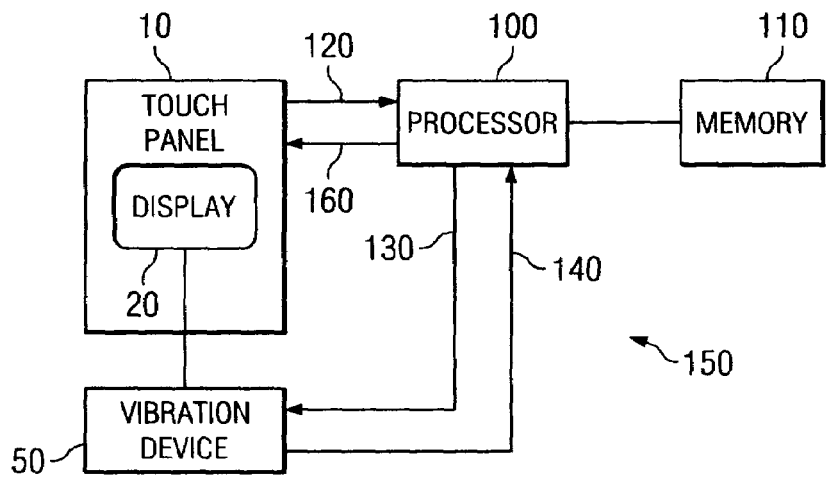
FIG. 3 is a block diagram illustrating an exemplary touch device capable of providing tactile feedback, in accordance with embodiments of the present invention.

FIG. 3 is a block diagram illustrating an exemplary touch device 150 capable of providing tactile feedback to a user, in accordance with embodiments of the present invention. The touch device 150 includes the touch panel 10, the vibration device 50, a processor 100 and a memory device 110. The touch panel 10 includes a display 20 compliantly mounted in a housing 30 (as shown in FIGS. 1 and 2). The processor 100 in combination with the memory device 110 controls the operation of the vibration device 50.

The processor 100 is connected to receive from touch panel 10 a position signal 120 indicative of the position on the display 20 of a user-controlled object. The processor 100 compares the position indicated by the position signal 120 to known key locations on the display 20 to determine whether the position corresponds to one of the known key locations. When the position does correspond to one of the key locations, the processor 100 generates a drive signal 130 to initiate the vibration of the touch panel 10. However, when the position does not correspond to one of the key locations, the processor 100 does not generate the drive signal 130 so that the display 20 does not begin to vibrate, or if already vibrating, stops vibrating.

For example, as described above in connection with FIG. 1, the position on the display 20 of the touch panel 10 indicated by the position signal 120 corresponds to a region on the display 20 occupied by the user-controlled object, and each key location on the display 20 corresponds to a key area on the display 20. The processor 100 is operable to determine when an overlap exists between the region occupied by the user-controlled object and one of the key areas. When the occupied region is devoid of keys (i.e., there is no overlap between the occupied region and any key area), the processor 100 does not activate the vibration device 50, or if the vibration device 50 is already activated, the processor 100 deactivates the vibration device 50. However, when there is overlap between the occupied region and at least a portion of one of the key areas, the processor 100 activates the vibration device 50 to produce the vibration of the display 20.

The processor 100 is further connected to measure the amplitude of the vibration 140 of the vibration device 50 and to adjust the level of the drive signal 130 as necessary to maintain the amplitude of the vibration of the display 20. For example, in one embodiment, the processor 100 is operable to detect a click event performed by the user-controlled object when the drive signal 130 increases to a level exceeding a threshold level. In response to detecting a click event, the processor 100 is further operable to generate a click indicate signal 160. The click indicate signal 160 causes the touch panel 10 to produce a click indication, such as an audible click indication, to the user. For example, in embodiments in which the touch panel 10 includes a loudspeaker, the click indicate signal 160 causes the loudspeaker to produce the audible click indication. In embodiments in which the click indication is a tactile click indication provided by the vibration device 50, the click indicate signal 160 interrupts the vibration of the display 20 for a predetermined time. In a further embodiment, the click indicate signal 160 is provided to a conventional built-in loudspeaker in the electronic device incorporating the touch device 150 to provide an audible beep, tone or click to the user.

The processor 100 can be a microprocessor, microcontroller, programmable logic device or any other processing device. The memory device 110 can be any type of memory device for use on any type of electronic device. For example, the memory device 110 can be a flash ROM, EEPROM, ROM, RAM or any other type of storage device. In one embodiment, the memory device 110 stores software executable by the processor 100 to cause the processor 100 to generate the drive signal 130. For example, the software can include an algorithm for comparing the position of the user-controlled object, as indicated in the position signal 120, to known key locations on the display 20 and generating the drive signal 130 to initiate vibration of the vibration device 50. In another embodiment, the algorithm is stored in the processor 100, and the memory device 110 stores data used by the processor 100 during the vibration control process. For example, the memory device 110 can store the known key locations for comparison with the position of the user-controlled object. As another example, the memory device 110 can store the signal threshold level for use in detecting a click event.

Figure 4:
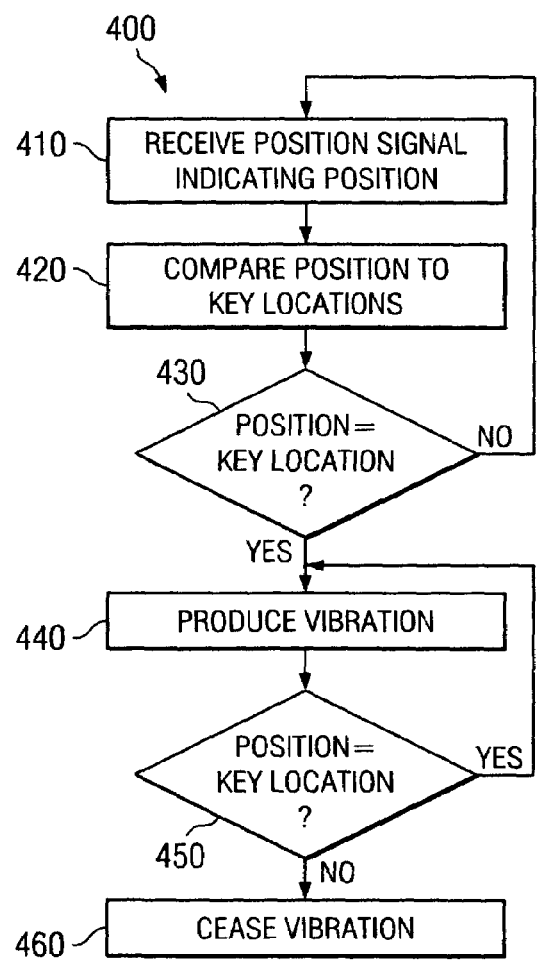
FIG. 4 is a flow chart illustrating an exemplary process for providing tactile feedback to a user of a touch device, in accordance with embodiments of the present invention.

FIG. 4 is a flow chart illustrating an exemplary process 400 for providing tactile feedback to a user of a touch device, in accordance with embodiments of the present invention. Initially, at block 410, a position signal indicating a position on the display of a touch panel of the touch device touched by a user-controlled object is received. At block 420, the position indicated by the position signal is compared to key locations of keys displayed on the display. At block 430, a decision is made whether the indicated position corresponds to one of the key locations. When the indicated position does not correspond to one of the key locations, the process is repeated at block 410. However, when the indicated position does correspond to one of the key locations, at block 440, the display is caused to vibrate to provide a tactile key location indication to the user. At block 450, as long as the position continues to correspond to the key location, at block 440, the display is vibrated. However, when the position no longer corresponds to the key location, at block 460, the vibration of the display is ceased.

The innovative concepts described in the present application can be modified and varied over a wide rage of applications. Accordingly, the scope of patents subject matter should not be limited to any of the specific exemplary teachings discussed, but is instead defined by the following claims.

I claim:

1. A touch device for providing tactile feedback to a user, said touch device comprising:
    a touch panel comprising a display displaying keys constituting a software-defined keypad, said touch panel operable to produce a position signal indicative of a position on said display touched by a user-controlled object;

a processor operable in response to said position signal to generate a drive signal when said position on said touch panel corresponds to the key location of one of said keys on said soft keypad; and a vibration device operable in response to said drive signal to cause said display to vibrate while said position corresponds to said key location to provide a tactile key location indication to the user;

wherein said processor is additionally operable to detect damping of said vibration by said user-controlled object touching said display, and, in response to said detecting, to generate a click indicate signal indicative of a click event performed by said user-controlled object on said one of said keys at said key location corresponding to said position on said display.

2. The touch device of claim 1, further comprising:

an electro-acoustic transducer operable in response to said click indicate signal to produce an audible click indication to the user.

3. The touch device of claim 2, wherein said electro-acoustic transducer is operable to drive said display in a direction orthogonal to the plane of said display to produce said audible click indication.

4. The touch device of claim 1, wherein said processor is further operable to interrupt said drive signal in response to said click indicate signal to cause said vibration device to interrupt said vibration.

5. The touch device of claim 1, wherein said vibration device is mechanically coupled to said touch panel.

6. The touch device of claim 5, wherein said vibration device includes a motor.

7. The touch device of claim 5, wherein said vibration device includes a voice coil.

8. An electronic device comprising the touch device of claim 1 and a silent ring vibrator, wherein said silent ring vibrator is used as said vibration device.

9. The touch device of claim 1, wherein said display is planar and said vibration is parallel to the plane of said display.

10. The touch device of claim 9, wherein:

said touch device additionally comprises a housing in which said display is compliantly mounted;

said vibration device comprises a movable portion, said movable portion and said display constituting a mechanical assembly having a resonant frequency; and said processor is operable to drive said moveable portion at a frequency equal to said resonant frequency of said mechanical assembly.

11. The touch device of claim 10, wherein:

said touch device additionally comprises a flexible surround compliantly mounting said display in said housing; and said flexible surround has a resonant frequency equal to that of said mechanical assembly.

12. The touch device of claim 9, wherein:

said vibration device additionally comprises a static portion;

said static portion of said vibration device and said display are each compliantly coupled to said housing; and said display and vibration device are configured to vibrate in opposite directions such that the net momentum collectively applied to said housing by said mechanical assembly and said vibration device approaches zero.

13. The touch device of claim 1, wherein said processor is further operable to modulate said drive signal dependent on said position of said user-controlled device relative to said key location to provide a three-dimensional tactile key location indication to the user.

14. The touch device of claim 1, wherein said processor is operable to generate said drive signal to drive said vibration device at a frequency between 100 Hz and 200 Hz.

15. The touch device of claim 1, wherein said user-controlled object is a finger or a stylus.

16. The touch device of claim 1, wherein said touch panel comprises an analog resistive sensor, infrared sensor, acoustic sensor, capacitive sensor, ultrasonic sensor or electromagnetic inductive sensor.

17. A method for providing tactile feedback to a user of a touch device comprising a display, said method comprising:

receiving a position signal indicative of a position on a touch panel comprising a display displaying keys constituting a software-defined keypad, said display touched by a user-controlled object;

comparing said position to key locations of keys displayed on said display; and causing said display to vibrate while said position corresponds to one of said key locations to provide a tactile key location indication to the user;

detecting damping of said vibration caused by said user-controlled object touching said touch panel; and in response to said detecting, identifying a click event performed on the one of said keys at said key location corresponding to said position on said display.

18. The method of claim 17, further comprising:

in response to said identifying said click event, providing an audible click indication to the user.

19. The method of claim 18, wherein said providing said audible click indication comprises:

driving said display in a direction orthogonal to the plane of said display to provide said audible click indication.

20. The method of claim 17, further comprising:

in response to said identifying said click event, interrupting said vibration of said display.

21. The method of claim 17, wherein said causing said display to vibrate further includes:

causing said display to vibrate parallel to the plane of said display.

22. The method of claim 21, in which:

said touch device additionally comprises a housing in which said display is compliantly mounted;

said display constitutes part of a mechanical assembly having a resonant frequency; and causing said display to vibrate comprises driving said display at a frequency equal to said resonant frequency of said mechanical assembly.

23. A touch device for providing tactile feedback to a user, said touch device comprising:

a touch panel comprising a display displaying keys constituting a software-defined keypad, said touch panel operable to produce a position signal indicative of a position on said display touched by a user-controlled object;

a processor operable in response to said position signal to generate a drive signal when said position on said touch panel corresponds to the key location of one of said keys on said soft keypad; and a vibration device operable in response to said drive signal to cause said display to vibrate while said position corresponds to said key location to provide a tactile key location indication to the user;

wherein;

said display is planar and said vibration is parallel to the plane of said display;

said touch device additionally comprises a housing in which said display is compliantly mounted;

said vibration device comprises a movable portion, said movable portion and said display constituting a mechanical assembly having a resonant frequency; and said processor is operable to drive said moveable portion at a frequency equal to said resonant frequency of said mechanical assembly.

24. A touch device for providing tactile feedback to a user, said touch device comprising:

a touch panel comprising a display displaying keys constituting a software-defined keypad, said touch panel operable to produce a position signal indicative of a position on said display touched by a user-controlled object;

a processor operable in response to said position signal to generate a drive signal when said position on said touch panel corresponds to the key location of one of said keys on said soft keypad; and a vibration device operable in response to said drive signal to cause said display to vibrate while said position corresponds to said key location to provide a tactile key location indication to the user;

wherein;

said display is planar and said vibration is parallel to the plane of said display;

said vibration device additionally comprises a static portion;

said static portion of said vibration device and said display are each compliantly coupled to said housing; and said display and vibration device are configured to vibrate in opposite directions such that the net momentum collectively applied to said housing by said mechanical assembly and said vibration device approaches zero.

25. A method for providing tactile feedback to a user of a touch device comprising a display, said method comprising:

receiving a position signal indicative of a position on a touch panel comprising a display displaying keys constituting a software-defined keypad, said display touched by a user-controlled object;

comparing said position to key locations of keys displayed on said display; and causing said display to vibrate while said position corresponds to one of said key locations to provide a tactile key location indication to the user;

wherein said causing said display to vibrate further includes causing said display to vibrate parallel to the plane of said display; and in which:

said touch device additionally comprises a housing in which said display is compliantly mounted;

said display constitutes part of a mechanical assembly having a resonant frequency; and causing said display to vibrate comprises driving said display at a frequency equal to said resonant frequency of said mechanical assembly.

26. A method for providing tactile feedback to a user of a touch device comprising a display, said method comprising:

receiving a position signal indicative of a position on a touch panel comprising a display displaying keys constituting a software-defined keypad, said display touched by a user-controlled object;

comparing said position to key locations of keys displayed on said display; and causing said display to vibrate while said position corresponds to one of said key locations to provide a tactile key location indication to the user, wherein said causing said display to vibrate includes, in response to said position of said user-controlled device relative to said one of said key locations, modulating the amplitude with which said display vibrates to provide a three-dimensional tactile key location indication to the user.

* * * * *